UNITED STATES PATENT OFFICE.

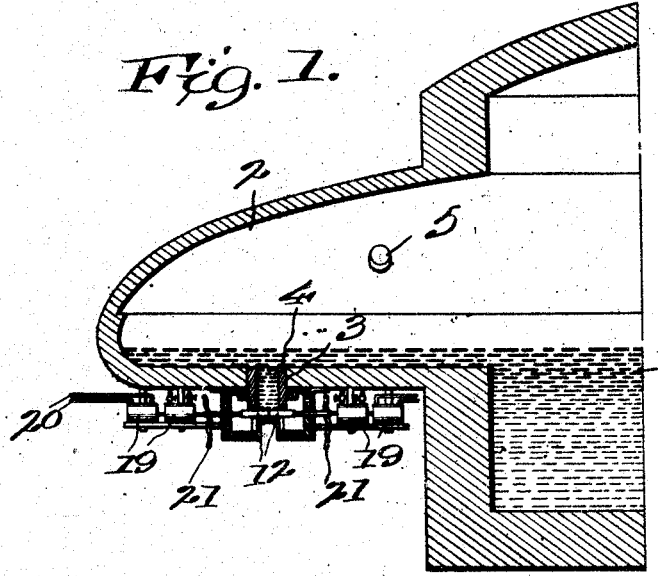
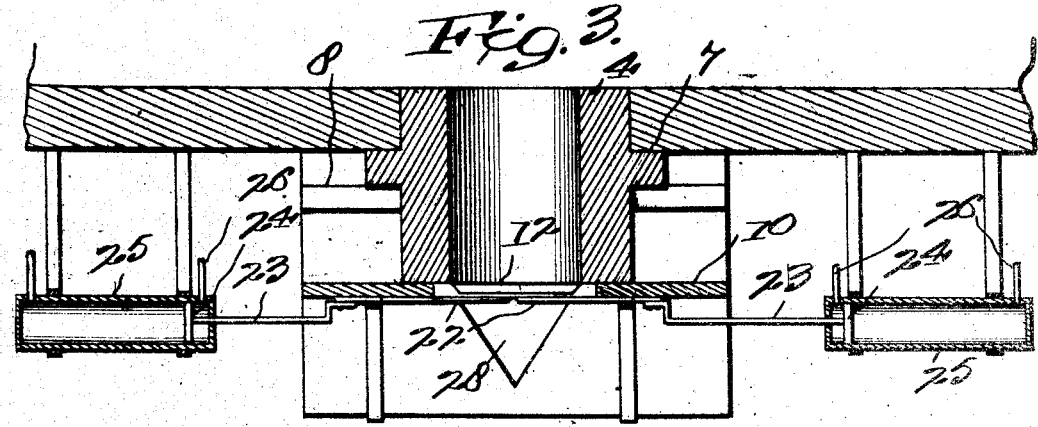
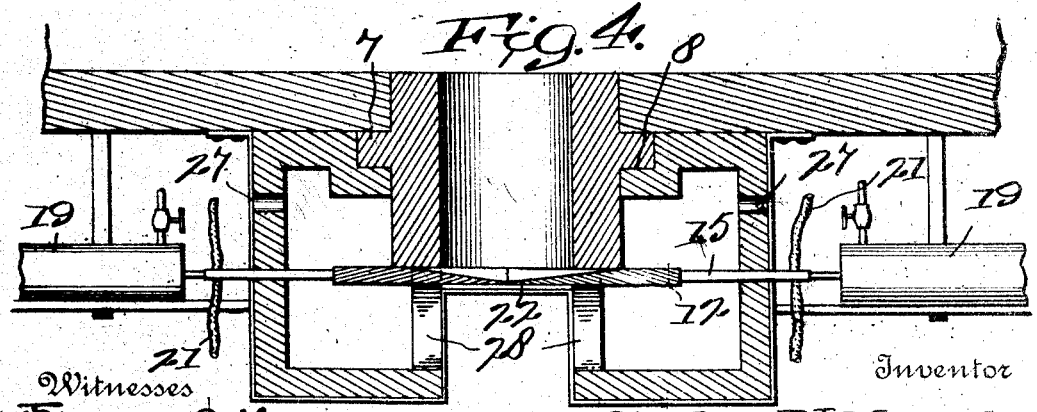

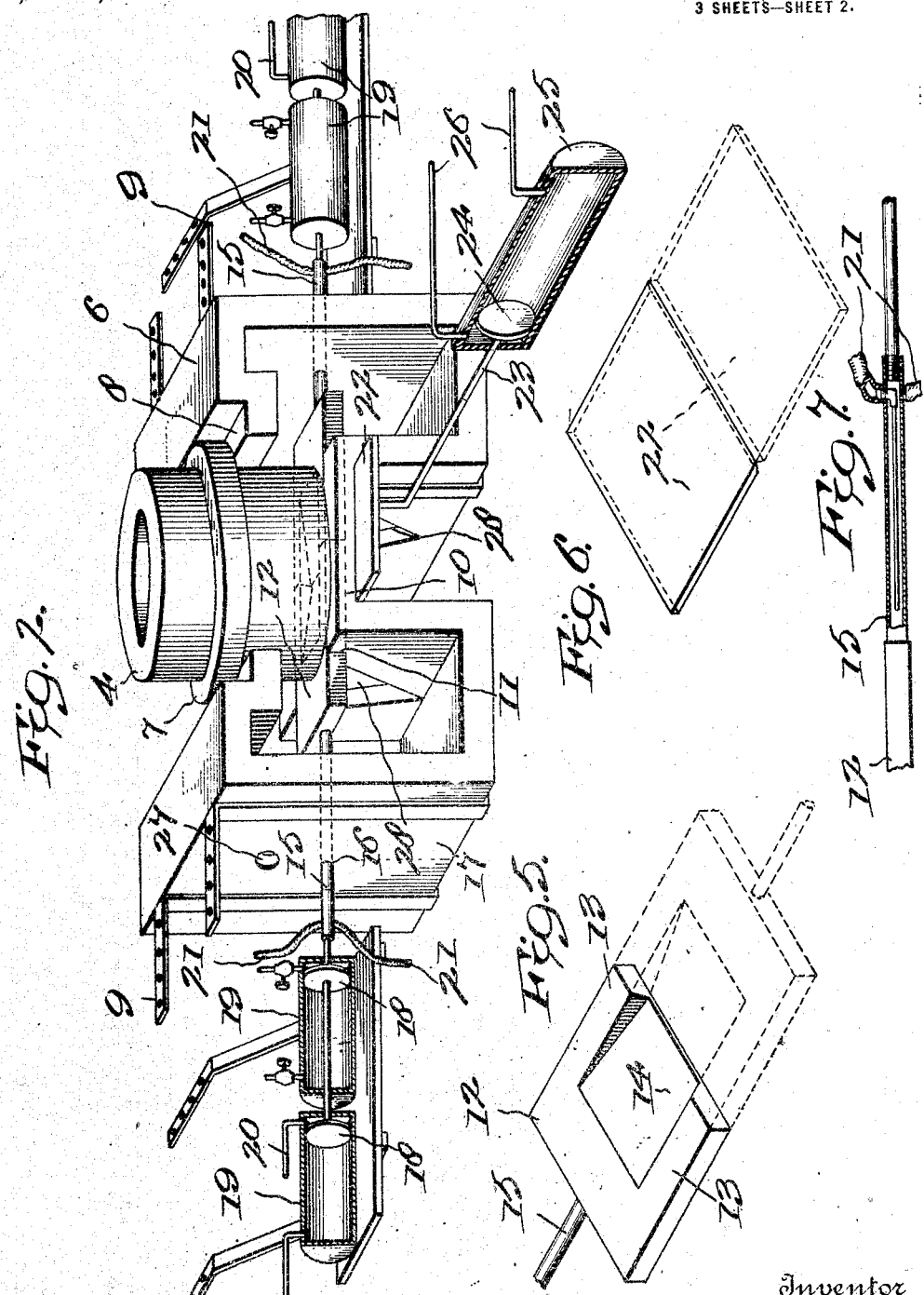

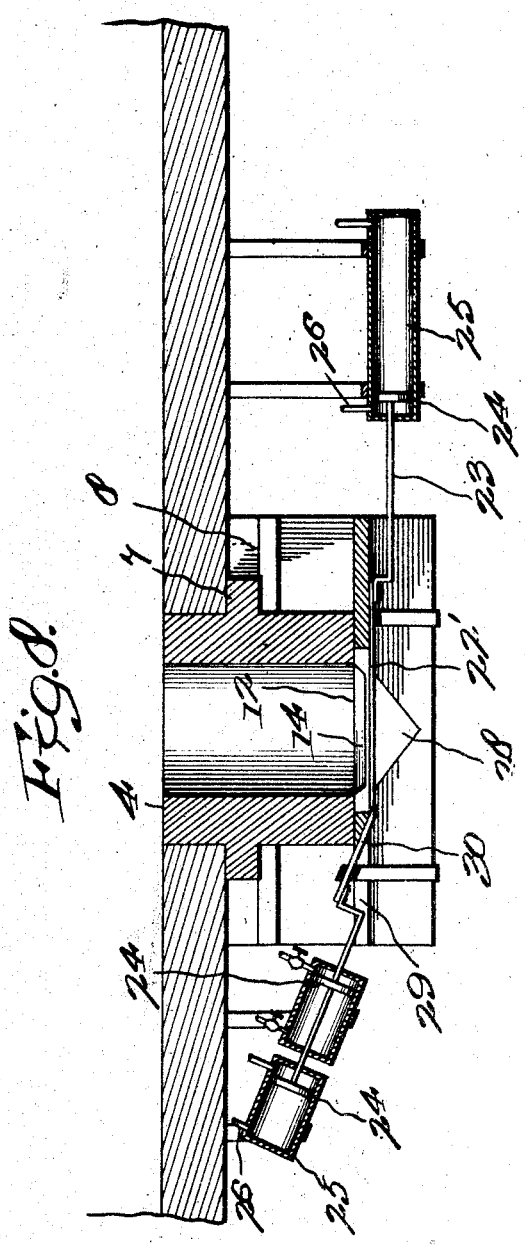

STEPHEN W. MANNING, OF SAPULPA, OKLAHOMA.

APPARATUS FOR SEVERING PLASTIC GLASS.

1,174,173.  Specification of Letters Patent.  Patented Mar. 7, 1916.

Application filed January 28, 1915. Serial No. 4,901.

*To all whom it may concern:*

Be it known that I, STEPHEN W. MANNING, a citizen of the United States, residing at Sapulpa, in the county of Creek and State of Oklahoma, have invented certain new and useful Improvements in Apparatus for Severing Plastic Glass; and I do hereby declare the following to be a full, clear, and exact description of the invention, such as will enable others skilled in the art to which it appertains to make and use the same.

My invention relates to apparatus for dropping and severing a portion of plastic or fluid glass into shapes and portions adapted to be used in the manufacture of molded glass articles, such as fruit jars, milk bottles, etc.

It is obvious that the portions or lumps so cut off may be used wherever such lumps or portions are desirable. They might be used, therefore, for molded tumblers, dishes, etc., in some instances.

Various devices have been made for the purpose of cutting a stream of flowing glass into lumps or sections; these sections or lumps to be placed into molds and subjected to pressure. Some of these relate to what might be called measuring devices, where a certain cavity, say, is filled with molten glass to overflow and the excess scraped off. Others are those in which the stream of flowing glass is severed by a pair of shears; and there are still other means. In all these cases, however, two objections exist. First, glass, as is well known, in a plastic or semi-liquid condition, has physical properties which are quite peculiar to itself. Thus, it is impossible to form a lump of glass from a stream of plastic glass, without having the mark of the laps show in said lump. That mark will remain throughout process of molding. Such a mark can be seen on the bottom end, usually, of many molded articles. The glass is not sufficiently fluid for the stream to unite into one solid mass, or to absorb or melt into itself the laps. This portion, always chilled by contact, or perhaps for other reasons, is always harder than the rest of the glass; and second, the effect of its superior hardness continues, making it impossible to procure an even distribution of glass in the blown article, for glass is a material which has a low specific heat, and, moreover, when in the workable condition is quite viscid and plastic, so that the molecules, while mobile, are very feebly so. Reactions, solutions, and other changes, therefore, go on very slowly in a mass of glass when the latter is in a workable condition, and, owing to the low specific heat, soon cease, hence the mark and the uneven distribution will show on the finished article.

The object of the present invention is to avoid, or to minimize the mark left by the laps on the bottom end of the molded article.

In carrying out my invention, therefore, I provide means to effect the severance of the lump in such a way that the quantity of glass left for the said laps is reduced to almost nothing. I also conduct my severing operation in such a manner that I cause the moving forward of the severing means upon the portion of glass, to be effected at a speed determined, first, by the nature of the object to which the glass is to be made into, second, by the shape of the portion of the glass, and, third, by its viscidity. I find that by changing the rate of speed of the severing means I am enabled to affect, very materially, the shape or contour of the lump so severed. This shaping is done only at the place where the severing occurs, but it also has its effect upon the other end of the severed lump; the time relation being an important element here.

I provide an apparatus which consists of a glass furnace having a bay or recess in which fluid glass is retained, and in the bottom of this recess I provide an opening and a conduit fitted into said opening. In this conduit there remains constantly a body of glass. This body, on leaving the lower end of the conduit owing to the surface tension of the viscid glass, is always round in cross section. I effect the severance of this body into segregated lumps by moving the severing agents in several directions toward the center, or past the center of the discharge chamber. I also provide a support for the conduit, which support may be heated.

In the accompanying drawings: Figure 1 is a sectional view of a glass furnace with the bay aforesaid, and my severing device attached; Fig. 2 is a perspective view of the apparatus, certain parts being in section, unattached; Fig. 3 is a section through the said apparatus in part, looking toward the right in Fig. 2; Fig. 4 is a section through the same apparatus of Fig. 2, at right angles to the section of Fig. 3; Fig. 5 is a view of one of the clay glass-cutting blades; Fig. 6 is a view of one of a pair of the metal severing blades; Fig. 7 is a view of a cooling device for the piston rods; and Fig. 8 is a view of a somewhat modified form, partly in section.

In the drawings, 1 represents the glass furnace, 2 the bay therein, 3 the opening in the bottom of the bay, 4 the conduit through which the glass is discharged, and 5 an opening for introducing a heating device into the bay or recess. The conduit is supported, as may be seen, by a frame 6 attached to the underside of the bay, which may, of course, be supported in the usual way, by a pillar. This conduit is provided with a flange 7 which rests upon a suitable flange 8, cut in the walls of the supporting device or bracket, which, of course, is made of fire clay and rests upon the straps or iron supports 9. The lower end of this conduit rests upon the bent-up portion 10 of the support shown in Fig. 2. This portion is cut away at 11 into ways, in which slide the fire clay severing blades 12. These blades are shaped, as shown in Fig. 5, having two walls or abutments, one on each side, 13 and a depressed portion 14 coming to a comparatively narrow edge between them. The width of this portion 14 is less than the inside diameter of the conduit, so that the edges of the abutments of the clay blades rest against the lower face of the conduit. To the rear of each of these blades 14 is attached a rod 15, passing through an opening 16 in the wall 17 of the supporting bracket, and continued as the piston rod of a piston 18 working in a cylinder 19.

In Fig. 2 I have shown a tandem cylinder, though it is obvious that a single cylinder need be used. Each of these cylinders is provided with means for admitting a pressing agent to either side of the piston. These cylinders may also be connected by a pipe, so that both knives may be moved simultaneously. This pipe is indicated at 20.

The sign 21 indicates a pipe for admitting air, water, or other cooling medium, to the piston rod 15, as indicated in Fig. 2. It will be seen that, as these blades are pushed toward each other by the same pressing agent, which may be either air, steam, or some other gas, they cut a portion from the stream issuing from the mouth of the conduit, and the shape of the cut-off portion will depend upon the speed and regularity with which these blades are made to approach each other; the consistency of the glass being otherwise the same. It is obvious that these blades will not have sharp enough edges to completely sever the glass. There will thus be left between these edges a web or film of hot glass, which, in order to make the apparatus efficient, should also be severed. To effect this severance last named, I arrange two metal blades, preferably of steel, 22, and shaped as shown in Fig. 6, to work at right angles to the clay blades 12. These come into contact with the glass at a period when it has been chilled somewhat and sever the glass completely along the line between the clay blades 14. They plane it off, as it were, along the level under surface of the clay blade, being guided in ways not clearly shown in Fig. 2, but shown in Fig. 3, and being thrust forward by rods 23 attached to pistons 24, working in cylinders 25, connected by pipes 26 to a suitable source of fluid supply. The steam, or other fluid, being admitted to one side of the piston in all these cylinders pushes it forward, and being admitted to the other side pulls the piston and its attached blade back. I have not shown the means by which steam may be supplied hereto, and that means may be hand operated, or automatic in operation.

At 27, Fig. 2, I show an opening into which a burner may be introduced to heat the lower part of the conduit. I show at 28 openings through which heated gases may escape.

In Fig. 8, I have shown the metal blades arranged in a slightly modified way. These blades here are not symmetrical. One of them, 22′, traverses the entire extent of the joint between the clay blades 12. This blade 22′ is beveled, as shown, and in one of the clay blades there is provided an opening 29, through which a blade 30, coöperating with the blade 22′ is thrust. It will be seen that this blade 30 is thrust obliquely downward to the end of the blade, passing along the bevel of the blade 22′, thus giving a shearing cut and severing the last trace of glass string cleanly and sharply.

It will be noted that by arranging the clay blades with the bevel face uppermost, and the metal blades with the bevel face lowermost, I provide two practically plane surfaces in contact, so that the movement of the lower, or metal blades, is facilitated, and their cutting effect made clean and sharp.

It will be obvious that in the apparatus of Fig. 8 severance is not central of the lump as it is in the structure shown in Fig. 2.

It is apparent that by varying or manipulating the supply of steam to the cylinders, I can vary the speed at which the various blades progress in their work. This variation has, as has already been indicated, an important relation to the shape of the lump cut off, as well as to the position of the tear, or wire upon the lump, and, consequently, to its position in the completed pressed article. This wire, however, when my apparatus is worked properly, and the process carried on with care, is practically invisible.

Having thus described my invention, what I claim as new and desire to secure by Letters Patent of the United States is:—

1. In an apparatus for shearing plastic glass, in combination, a glass melting furnace, a recess or bay connected with said furnace and having a discharge opening in the bottom thereof, a flanged conduit in communication with said opening, a support for said conduit with which the flange and end of the conduit engages and a pair of blades with meeting edges for shearing or cutting across a portion of glass and closing the mouth of said conduit.

2. In an apparatus for shearing plastic glass, in combination, a glass melting furnace, a recess or bay connected with said furnace and having a discharge opening in the bottom thereof, a flanged conduit in communication with said opening, a support for said conduit with which the flange and end of the conduit engages and a pair of blades with meeting edges for shearing or cutting across a portion of glass and closing the mouth of said conduit, said blades having edges adapted to meet at the diametric middle of said conduit.

3. In an apparatus for shearing plastic glass, in combination, a glass melting furnace, a recess or bay connected with said furnace and having a discharge opening in the bottom thereof, a flanged conduit in communication with said opening, a support for said conduit with which the flange and end of the conduit engages and a pair of blades with meeting edges for shearing or cutting across a portion of glass and closing the mouth of said conduit, said blades having edges adapted to meet at the diametric middle of said conduit, and also having means whereby they may be advanced at the same speed for both.

4. In an apparatus for shearing plastic glass, in combination, a glass melting furnace, a recess or bay connected with said furnace and having a discharge opening in the bottom thereof, a flanged conduit in communication with said opening, a support for said conduit with which the flange and end of the conduit engages, a pair of blades with meeting edges for shearing or cutting across a portion of glass and closing the mouth of said conduit, said blades having edges adapted to meet at the diametric middle of said conduit, and means for advancing said blades at any speed desired, and for varying the rate of advance, whereby the shape of the string attached to the cut-off portion may be varied.

5. In an apparatus for shearing plastic glass, in combination, a glass melting furnace, a recess or bay connected with said furnace and having a discharge opening in the bottom thereof, a flanged conduit in communication with said opening, a support for said conduit with which the flange and end of the conduit engages and a pair of fire-clay blades with meeting edges for shearing or cutting across a portion of glass and closing the mouth of said conduit.

6. In an apparatus for shearing plastic glass, in combination, a glass melting furnace, a recess or bay connected with said furnace and having a discharge opening in the bottom thereof, a conduit in communication with said opening, a pair of blades with meeting edges for shearing or cutting across a portion of glass and closing the mouth of said conduit, and a second pair of glass cutting blades traveling across the joint where the blades first-mentioned meet, to sever any web left between the edges of said first pair of blades.

7. In a device for severing portions of plastic glass, in combination, a flanged conduit, a support for said conduit, an end of the conduit resting upon said support, ways in said support, a pair of blades adapted to move in said ways across the discharge opening in the conduit, means for moving said blades, and means for heating the said support.

8. In a shearing device for cutting plastic glass, in combination, a pair of blades adapted to be moved across a glass discharge opening and to meet across said opening, ways for guiding the movement of said blades, and a second pair of blades adapted to be moved in a direction at an angle to the direction of movement of the first pair.

9. In a glass shearing device, in combination, a pair of clay blades adapted to meet edge on across the mouth of a glass discharge conduit, and a pair of metallic blades adapted to meet edge on at an angle to the joint between the clay blades.

10. In a glass shearing device, in combination, a conduit for discharging plastic glass, a pair of shearing blades, ways in which said blades may be guided in contact with the wall of the opening so as to meet edge on across the opening, a rod attached to the back of each blade, a piston attached to each rod, a cylinder, freely communicating means between said cylinders whereby pressure in the two may remain even, means for varying the pressure in said cylinders at will, whereby the rate and character of the advance of the blades may be controlled and the shape and size of the cut-off portion varied at will, and a second pair of blades adapted to be moved across the joint between the blades first mentioned, and cylinders and pistons for moving said last mentioned blades.

11. In a device for cutting off portions of plastic glass, in combination, a glass conducting conduit, ways beneath the discharge end of said conduit, a pair of blades traveling in said ways in contact with the lower face of said conduit, said blades consisting each of a thick slab of fire clay provided with a beveled central portion at one edge, the length of the bevel being greater than the inside crosswise measurement, but less than the outside crosswise measurement of said conduit.

12. In a device for cutting off portions of plastic glass, in combination, a glass conducting conduit, ways beneath the discharge end of said conduit, glass severing blades arranged in said ways, the cutting edges of said blades being beveled from one side to the other, the bevel side being upward, beveled blades arranged below said first-mentioned blades, beveled from one side to the other, the bevel being on the lower side, and ways for the second set of blades, arranged at an angle to the direction of the ways of the first-mentioned blades, to guide the blades of the second set with their plane faces against the plane faces of the blades of the first set.

13. In a device for cutting plastic glass, in combination, a furnace, a flanged conduit for leading glass in the furnace, a support for said conduit having means for engaging with the flange and the mouth of said conduit, side channels in said support, means for introducing a heating agent into said side channels, clay knives for cutting off the discharge of glass inclosing the mouth of the conduit, means for pushing forward and withdrawing said clay knives, and means for cooling said pushing and withdrawing means against the heat in the support.

14. In a glass severing device, in combination, with a flanged conduit and means for severing glass discharged from said conduit and inclosing the mouth of said conduit, a support for said conduit, a flange on said support for engagement with the flange in the conduit, a bent-up portion on said support having ways therein, said bent-up portion adapted to engage the mouth of the conduit, knives sliding in said ways, side chambers in said support, and means for heating said side chambers, the conduit being in communication with said heating means.

In testimony whereof, I affix my signature, in presence of two witnesses.

STEPHEN W. MANNING.

Witnesses:
B. C. BURNETT,
MAX MEYER.